US012619948B2

(12) United States Patent
  Katsumata et al.

(10) Patent No.: US 12,619,948 B2
(45) Date of Patent: May 5, 2026

(54) SLOT ALLOCATION AND WORK INSTRUCTIONS METHOD FOR SORTING SYSTEM

(71) Applicant: HITACHI, Ltd., Tokyo (JP)

(72) Inventors: Daisuke Katsumata, Jenison, MI (US); Takaharu Matsui, Holland, MI (US); Takafumi Chida, Tokyo (JP); Norisuke Fujii, Tokyo (JP); Kohei Miyata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 291 days.

(21) Appl. No.: 18/139,813

(22) Filed: Apr. 26, 2023

(65) Prior Publication Data

US 2024/0362577 A1 Oct. 31, 2024

(51) Int. Cl.
  *G06Q 10/087* (2023.01)
  *B07C 5/36* (2006.01)
  *G06Q 10/0631* (2023.01)

(52) U.S. Cl.
  CPC ........... *G06Q 10/087* (2013.01); *B07C 5/361* (2013.01); *G06Q 10/06315* (2013.01)

(58) Field of Classification Search
  CPC . G06Q 10/087; G06Q 10/06315; B07C 5/361

USPC .......................................................... 705/28
See application file for complete search history.

(56) References Cited

FOREIGN PATENT DOCUMENTS

| | | | | |
|---|---|---|---|---|
| CA | 3149682 A1 | * | 6/2021 | ........... B65G 1/1371 |
| CN | 107025533 A | * | 8/2017 | ............. G06K 17/00 |
| WO | WO-2020006010 A1 | * | 1/2020 | ........... B65G 1/0407 |
| WO | 2021031556 A1 | | 2/2021 | |

* cited by examiner

*Primary Examiner* — Luna Champagne
(74) *Attorney, Agent, or Firm* — PROCOPIO, CORY, HARGREAVES & SAVITCH LLP

(57) ABSTRACT

A method for sorting a plurality of items and slot allocation in association with the plurality of items. The method may include collecting order data and slot data, wherein the slot data is information associated with a plurality of slots, each slot of the plurality of slots allows for placement of item bag over slot, and the plurality of items is to be sorted and inserted into bags associated with the plurality of slots; calculating combinations of order-slot allocation based on the order data and the slot data to estimate total time; and selecting a combination of the combinations of order-slot allocation with minimal total time and applying the selected combination.

14 Claims, 12 Drawing Sheets

300

| Order ID | Sort code | Time bucket | Weight | Length | Width | Height |
|----------|-----------|-------------|--------|--------|-------|--------|
| 0 | 101 | 6/8/2021 | 0.5 | 10 | 5 | 3 |
| 1 | 101 | 6/8/2021 | 0.5 | 5 | 5 | 1 |
| 2 | 102 | 6/8/2021 | 0.5 | 30 | 20 | 10 |
| 3 | 102 | 6/8/2021 | 1 | 12 | 8 | 1 |
| 4 | 102 | 6/8/2021 | 0.5 | 12 | 8 | 1 |
| 5 | 103 | 6/8/2021 | 0.5 | 12 | 8 | 1 |

| Slot name | Number capacity | Weight capacity | Volume capacity | Cycle time of sorting | Cycle time of bag replacement |
|---|---|---|---|---|---|
| A1 | 80 | 40 | 600 | 5.1 | 15.00 |
| A2 | 40 | 40 | 600 | 5.1 | 15.00 |
| A3 | 50 | 40 | 600 | 5.3 | 18.00 |
| B1 | 30 | 30 | 300 | 5.9 | 17.00 |
| B2 | 30 | 30 | 300 | 5.9 | 14.00 |
| B3 | 30 | 30 | 300 | 5.9 | 16.00 |

Layout

| Slot name | Allocated sort code | Total order number | Expected number of replacement bag | Expected total sorting time |
|-----------|---------------------|--------------------|-------------------------------------|------------------------------|
| A1 | 101 | 25 | 3 | 245 |
| A2 | 102 | 31 | 2 | 325 |
| A3 | 106 | 26 | 2 | 532 |
| B1 | 104 | 26 | 0 | 325 |
| B2 | 103 | 35 | 0 | 352 |
| B3 | 107 | 12 | 0 | 432 |

| Order ID | Time bucket | Allocated slot name | Sort code | Weight | Length | Width | Height | Already sorted |
|---|---|---|---|---|---|---|---|---|
| 0 | 6/8/2021 | A1 | 101 | 0.5 | 10 | 5 | 3 | True |
| 1 | 6/8/2021 | A2 | 101 | 0.5 | 5 | 5 | 1 | False |
| 2 | 6/8/2021 | B2 | 102 | 0.5 | 30 | 20 | 10 | False |
| 3 | 6/8/2021 | A6 | 102 | 1 | 12 | 8 | 1 | False |
| 4 | 6/8/2021 | B1 | 102 | 0.5 | 12 | 8 | 1 | False |
| 5 | 6/8/2021 | B2 | 103 | 0.5 | 12 | 8 | 1 | True |

| Slot name | Remaining Number capacity | Remaining Weight capacity | Remaining Volume capacity |
|---|---|---|---|
| A1 | 25 | 13 | 363 |
| A2 | 32 | 13 | 366 |
| A3 | 15 | 13 | 555 |
| B1 | 12 | 14 | 12 |
| B2 | 15 | 14 | 54 |
| B3 | 9 | 1 | 32 |

SLOT ALLOCATION AND WORK INSTRUCTIONS METHOD FOR SORTING SYSTEM

BACKGROUND

Field

The present disclosure is generally directed to a method and a system for sorting a plurality of items and slot allocation in association with the plurality of items.

Related Art

The number of internet shoppers has rapidly increased with the recent expansion of the internet environment, the spread of smartphones, and the entry of a wide variety of industries into the market. In addition, the recent spread of COVID 19 has made online shopping more active than ever. Because of this rapid increase in the number of online shoppers, logistics is under a heavy load. Especially in warehouses, the need for small-lot, multi-variety shipments and same-day deliveries has risen tremendously.

However, the use of operators and manual labor generally limits throughput and tends to have high costs while being error prone. With the increase of delivered goods/products and increase of labor cost, there has been an increase in the demand for efficient sorting equipment.

In the related art, a distance sorting method is utilized in item delivery across different supply stations. After determining the total delivery distances of all orders to be sorted in the item transfer container, the obtained total delivery distances corresponding to different supply stations is sorted, and the target supply station for the item transfer container is selected from the plurality of supply stations of the target sub-area according to the sorting result.

Using the method, the sum of delivery distances when delivering a plurality of items to be sorted at the target supply station is the shortest compared with the sum of the delivery distances when delivering a plurality of items to be sorted at each other supply station. This in turn reduces the total distance of the delivery path of a plurality of items to be sorted. The supply station with the smallest total delivery distance is selected from the plurality of supply stations of the target sub-area as the target supply station. If the workload of the supply station with the smallest total delivery distance is saturated, that is, there are already a large number of items waiting for sorting and delivery at the supply station, then the supply station with the second smallest total delivery is selected as the target supply station.

Generally, in a sorting system, each item to be sorted is inserted into a bag for each destination. When this bag is full or reaches a certain threshold, it must be replaced with an empty bag. This replacement may be performed by a machine or by an operator. In either case, the amount of replacement work can reduce overall throughput. But, as the related art considers only the distance involved without taking the number of bag replacement into consideration in deciding target destination, this leads to decrease in throughput.

In addition, if the bag replacement process is not performed at the right time, since the destination of an item at the target destination may be temporarily lost, the sorting system will cease to function until the bag replacement is completed. But because the related art does not mention the timing of bag replacement, throughput may be further decreased. Therefore, a new method/solution to enable logistics to become more efficient by providing efficient sorting method or work instructions is needed.

SUMMARY

Aspects of the present disclosure involve an innovative method for sorting a plurality of items and slot allocation in association with the plurality of items. The method may include collecting order data and slot data, wherein the slot data is information associated with a plurality of slots, each slot of the plurality of slots allows for placement of item bag over slot, and the plurality of items is to be sorted and inserted into bags associated with the plurality of slots; calculating combinations of order-slot allocation based on the order data and the slot data to estimate total time; and selecting a combination of the combinations of order-slot allocation with minimal total time and applying the selected combination.

Aspects of the present disclosure involve an innovative non-transitory computer readable medium, storing instructions for sorting a plurality of items, and slot allocation in association with the plurality of items. The instructions may include collecting order data and slot data, wherein the slot data is information associated with a plurality of slots, each slot of the plurality of slots allows for placement of item bag over slot, and the plurality of items is to be sorted and inserted into bags associated with the plurality of slots; calculating combinations of order-slot allocation based on the order data and the slot data to estimate total time; and selecting a combination of the combinations of order-slot allocation with minimal total time and applying the selected combination.

Aspects of the present disclosure involve an innovative server system for sorting a plurality of items and slot allocation in association with the plurality of items. The server system may include collecting order data and slot data, wherein the slot data is information associated with a plurality of slots, each slot of the plurality of slots allows for placement of item bag over slot, and the plurality of items is to be sorted and inserted into bags associated with the plurality of slots; calculating combinations of order-slot allocation based on the order data and the slot data to estimate total time; and selecting a combination of the combinations of order-slot allocation with minimal total time and applying the selected combination.

Aspects of the present disclosure involve an innovative system for sorting a plurality of items and slot allocation in association with the plurality of items. The system may include means for collecting order data and slot data, wherein the slot data is information associated with a plurality of slots, each slot of the plurality of slots allows for placement of item bag over slot, and the plurality of items is to be sorted and inserted into bags associated with the plurality of slots; means for calculating combinations of order-slot allocation based on the order data and the slot data to estimate total time; and means for selecting a combination of the combinations of order-slot allocation with minimal total time and applying the selected combination.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure.

Throughout the drawings, reference numbers are reused to indicate correspondence between referenced elements.

FIG. 3 illustrates an example order data table, in accordance with an example implementation.

FIG. 4 illustrates an example slot data table, in accordance with an example implementation.

FIG. 8 illustrates an example order data table associated with bag replacement instructions, in accordance with an example implementation.

DETAILED DESCRIPTION

Figure 1:
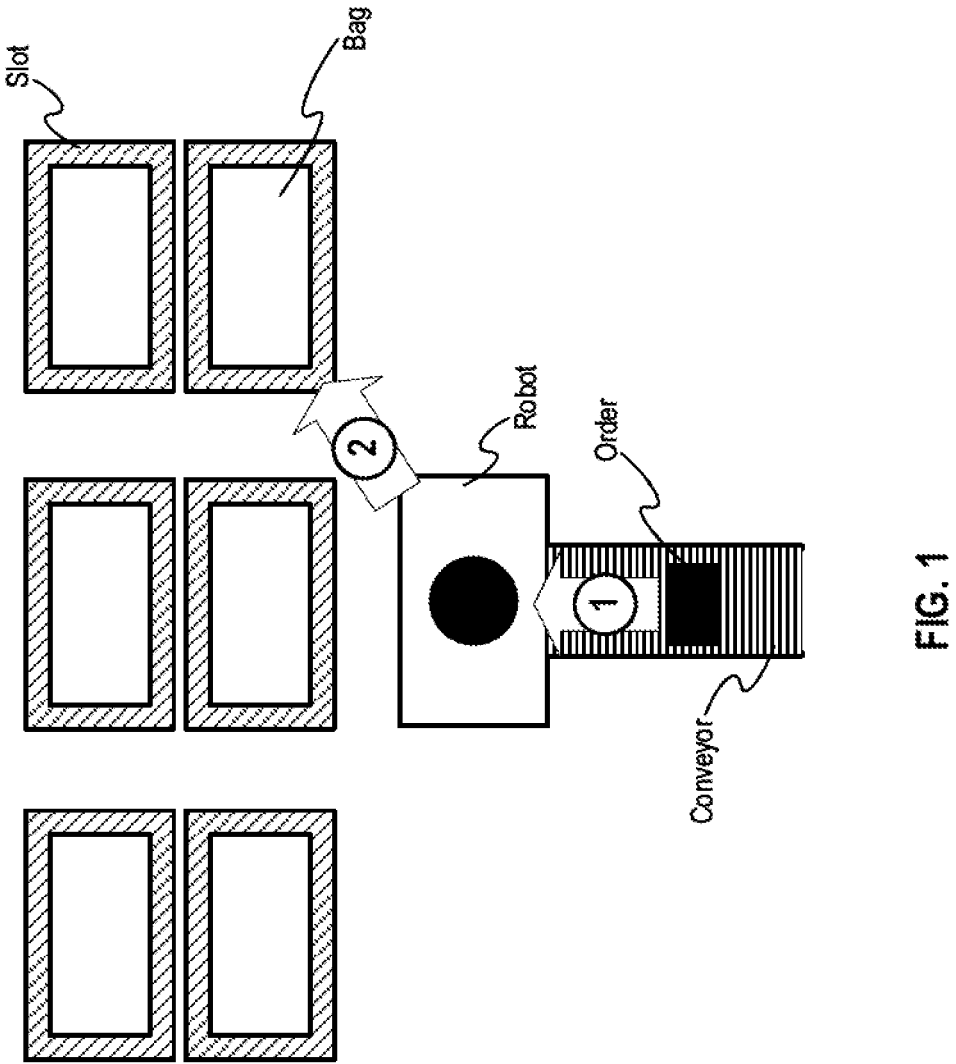
FIG. 1 illustrates an example sorting system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be.

Example implementations utilize the volume and weight of each item to be sorted, the bag's loadable capacity, weight, quantity, and travel time to each destination as inputs in calculating throughput. The destination of each item is determined, so that the throughput calculated from each travel time and the time required to exchange bags is maximized. Example implementations issue properly timed bag replacement instructions to help improve throughput of sorting systems.

For example, at a post office, in some sorting operations, it may be known in advance which items will be sorted in a certain time bucket (e.g., shift), and their capacity and weight. However, the order in which the items arrive at the sorting system is unknown. Example implementations perform calculations to determine to which destination the items to be sorted in this certain time bucket should be assigned to maximize the total throughput.

Based on this information and the loading status of the destination bag, an expected value of how many bags likely need to be replaced in the future can be calculated. If this expected value of the number of times the bag will not decrease when the bag is replaced at this time, the system will issue a replacement work order even if the bag replacement threshold has not been reached. Since the operator (or some device) can start the replacement work with a margin of time in advance, this can reduce the delay of replacement and contribute to throughput improvement.

FIG. 1 illustrates an example sorting system, in accordance with an example implementation. As illustrated in FIG. 1, orders to be sorted are brought in from a conveyor. The orders are then inserted by a robot into bags mounted to slots of the pre-determined destinations. When a bag in the slot is full of orders to be inserted, this bag must then be replaced with a new bag. Until this bag is replaced, orders having the same destination cannot be sorted. The time for the robot to sort varies depending on the different travel distances associated with the slots. Example implementations optimize these pre-determined destinations to improve overall throughput, which will be described in more details below.

Figure 2:
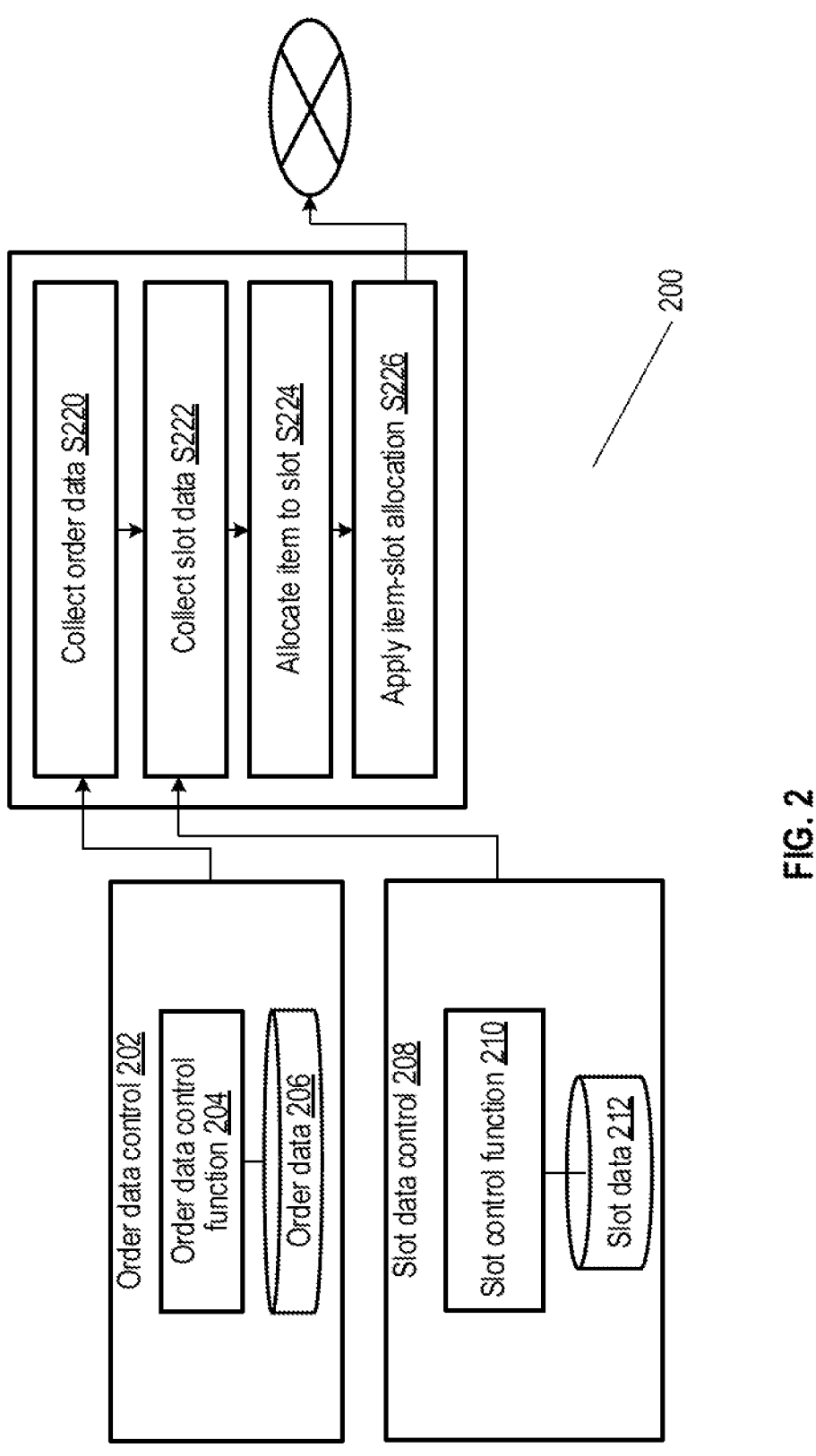
FIG. 2 illustrates an example system configuration for slot-order allocation, in accordance with an example implementation.

FIG. 2 illustrates an example system configuration for slot-order allocation, in accordance with an example implementation. At step S220, the system 200 collects order data. The system 200 may include an order data control module 202 and a slot data control module 208. The order data control module 202 utilizes an order data control function 204 to generate order data 206. FIG. 3 illustrates an example order data table 300, in accordance with an example implementation. Order data 206 is stored in table form as order data table 300. The order data table 300 stores data associated with orders such as, but not limited to, order ID, sort code, time bucket, weight, length, width, and height.

Order ID identifies orders as entries in the form of serial numbers. Sort code is the slot identifier. If the same sort code is used for different Order IDs, the associated orders are to be sorted into the same slot. On the other hand, orders having different sort codes are sorted into different slots. Allocation of individual sort code to appropriate slot is referred to as "order-slot allocation." Time bucket is the time period allotted for performance of the sorting action. The system 200 calculates order-slot allocation using orders in the same time bucket. Weight, length, width, and height are the weight and dimensions associated with an order and are used to estimate the number of times that bag needs to be replaced.

Referring back to FIG. 2, at step S222, slot data is collected. The slot data control module 208 utilizes a slot control function 210 to generate slot data 212. FIG. 4 illustrates an example slot data table 400, in accordance with an example implementation. Slot data 212 is stored in table form as slot data table 400. The slot data table 400 stores data associated with orders such as, but not limited to, slot name, number capacity, weight capacity, volume capacity, cycle time of sorting, and cycle time of bag replacement. Slot name identifies unique slots for which orders are to be inserted. Number capacity, weight capacity, and volume capacity are capacity measurements associated with a slot. If the quantity or weight or volume of orders in the bag exceeds this number, the bag must be replaced. Cycle time of sorting is the time between the robot receives the order, places the order in the target bag, and returns back to home. Cycle time of bag replacement is the bag replacement time needed to replace the bag. This can be performed by the operator, the robot itself, or other machines capable of performing bag replacement.

Order data 206 and slot data 212 are collected to calculate the order-slot allocation to allocate order item to slot at step S224. This order-slot allocation may be performed through performance of combination simulations and selection of the best combinations for adoption. At step S226, the order-slot/item-slot allocation is applied to the system. An order-slot allocation method using mix integer programing is described below.

Using the slot data 212 and order data 206, this system calculates the total sorting time (ST) using the following formula 1:

$$ST = CTS_s * \sum_{i \in I} x_{i,s}$$

$CTS_s$ is the sort time of the slot s and $x_{i,s}$ is a variable that has the value 1 when order i is assigned to slot s and 0 otherwise.

The number of bag replacements of slot s (ReplaceBag$_s$) by weight sum is expressed by formula 2:

$$ReplaceBag_s \geq \frac{1}{CAPW_s} * \sum_{i \in I} W_i * x_{i,s} - 1 \text{ for } s \in S$$

$CAPW_s$ is the capacity weight of slot s and $W_i$ is the weight of order i. I is the set of orders i to be covered and S is the set of slots s.

The number of bag replacements of slots by volume sum is expressed by formula 3:

$$ReplaceBag_s \geq \frac{1}{CAPV_s} * \sum_{i \in I} L_i * WI_i * H_i * x_{i,s} - 1 \text{ for } s \in S$$

$CAPv_s$ is the capacity volume of slot's and Li is the length of order i. $WI_i$ is the width of order i, and $H_i$ is the height of order i. Volume of an order is derived from product of length, width, and height of the order.

The variable AllocateSlot$_{c,s}$, which takes the value 1 when sort code c is allocated slots s and 0 otherwise, is obtained by formula 4:

$$BIGM * AllocateSlot_{c,s} \geq \sum_{i \in I} x_{i,s} \text{ for } c \in C, s \in S$$

C is the set of sort code c.

Only one sort code can be placed per slot. This constraint is expressed by formula 5:

$$1 \leq \Sigma_{c \in C} AllocateSlot_{c,s} \text{ for } s \in S$$

The total time (IST) is expressed by formula 6:

$$TST \geq ST + \sum_{s \in S} CTRB_s * ReplaceBag_s$$

$CTRB_s$ is the cycle time of bag replacement of slot s. The goal is to determine an order-slot allocation that minimizes this TST. For example, each formula term may be solved with a weight factor to reduce the bag exchange.

Figure 5:
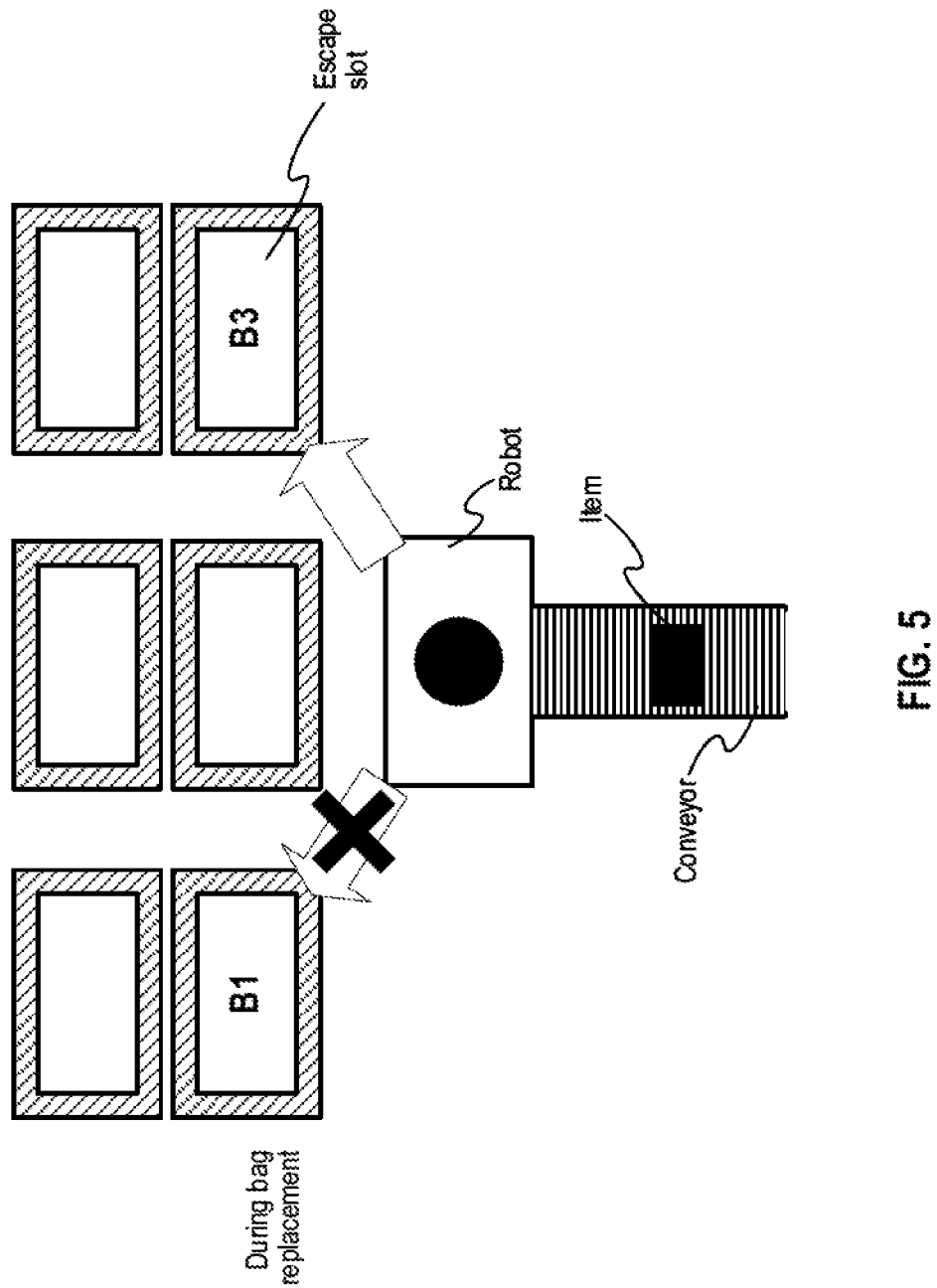
FIG. 5 illustrates a sorting system utilizing an escape slot, in accordance with an example implementation.

In some example implementations, when the number of sort code is smaller than the number of slots, an escape slot is provided to suppress throughput reduction caused by bag replacement. FIG. 5 illustrates a sorting system utilizing an escape slot, in accordance with an example implementation. As illustrated in FIG. 5, slot BI is in the process of replacing bags and the order allocated to slot BI is being delivered from the conveyor. To avoid system stoppage caused by bag replacement, the order is transported to the escape slot B3. In some example implementations, the escape slot B3 may be allocated with orders associated with different sort codes.

The allocation of orders to the escape slot B3 can be obtained using mixed integer programming as described above. In some example implementations, the escape slot B3 may be obtained from throughput allocation by running multiple simulations with different allocations.

Figure 6:
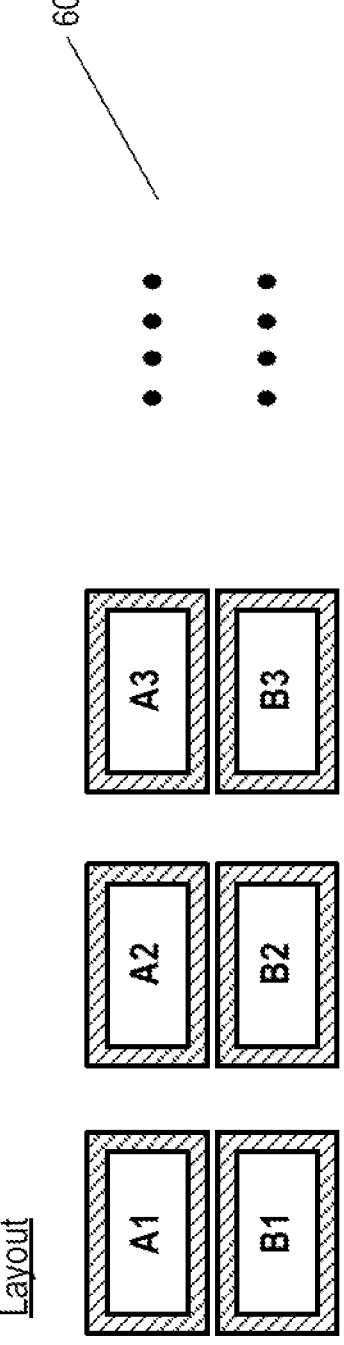
FIG. 6 illustrates an example confirmation screen of slot-order allocation, in accordance with an example implementation.

FIG. 6 illustrates an example confirmation screen of slot-order allocation, in accordance with an example implementation. The confirmation screen 600 may be displayed on an outing device such as a graphic user interface (GUI). As illustrated in FIG. 6, the confirmation screen 600 may show a graphical display of the slot layout and a slot-order allocation table showing the slot-order allocation results. The slot-order allocation table may include information such as, but not limited to, slot name, allocates sort code, total order number, expected number of replacement bag, and expected total sorting time. Each entry of the slot-order allocation table is associated with an identified slot shown in the slot layout.

Allocated sort code shows the sort code that is assigned to the identified slot. Total order number shows the number of orders sorted to the identified slot. These numbers can be obtained by the described mixed integer programming method, or by randomly rearranging the order and simulating them after the slot-order allocation has been determined.

Figure 7:
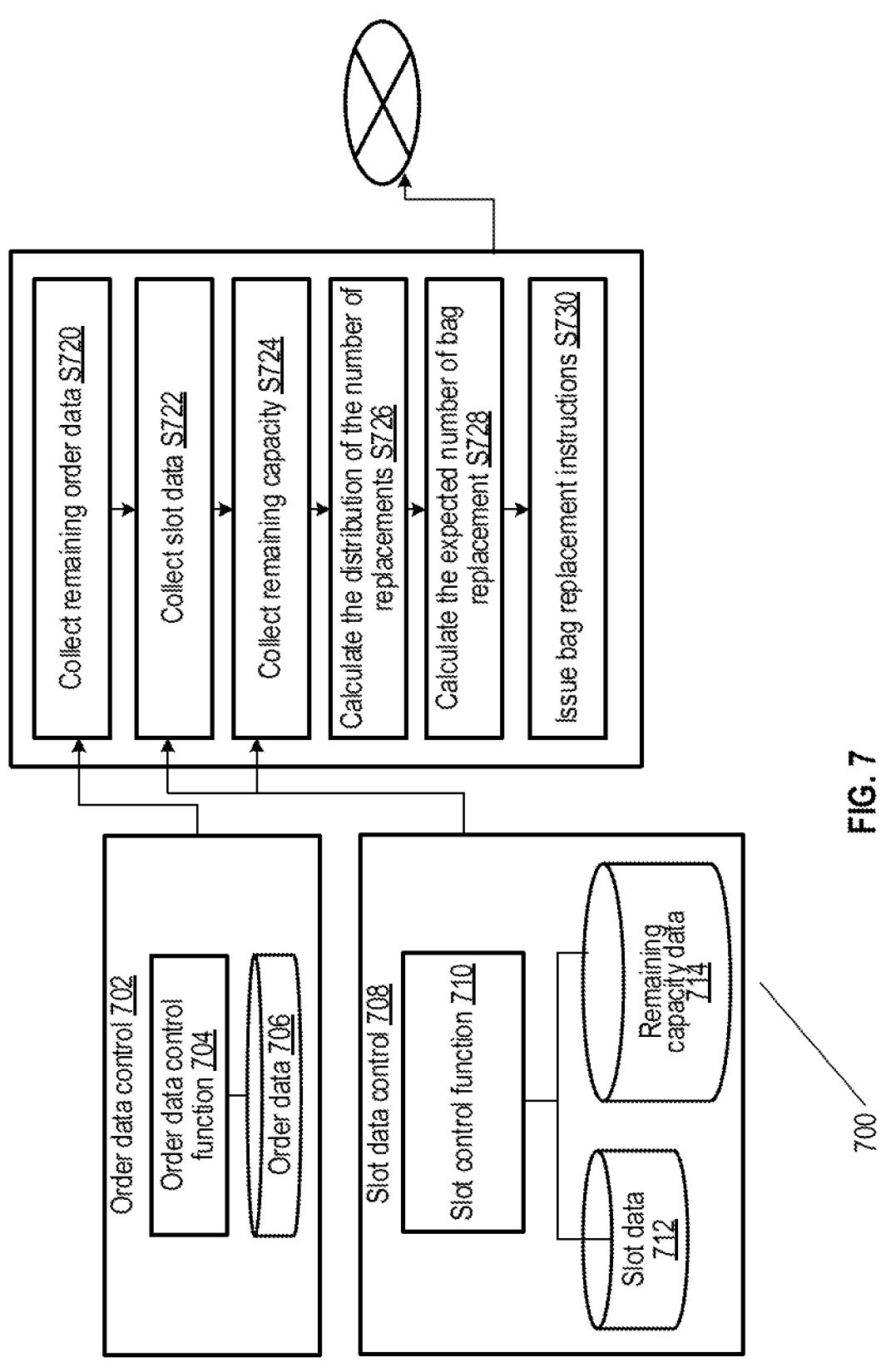
FIG. 7 illustrate an example system configuration for performing bag replacement instructions, in accordance with an example implementation.

FIG. 7 illustrate an example system configuration for performing bag replacement instructions, in accordance with an example implementation. The system 700 allows bag replacement to be performed while sorting is in progress. The system 700 may include an order data control module 702 and a slot data control module 708. The order data control module 702 utilizes an order data control function 704 to generate order data 706. FIG. 8 illustrates an example order data table 800 associated with bag replacement instructions, in accordance with an example implementation. Order data 706 is stored in table form as order data table 800.

The order data table 800 may include information such as, but not limited to, order ID, time bucket, allocated slot name, sort code, weight, length, width, height, and an already sorted field. The already sorted field indicates whether this order has already been sorted or not. The slot data control module 708 utilizes a slot control function 710 to generate slot data 712 and remaining capacity data 714. The slot data 712 takes the same form as the slot data table 400 of FIG. 4.

Figure 9:
FIG. 9 illustrates an example remaining capacity data table, in accordance with an example implementation.

FIG. 9 illustrates an example remaining capacity data table 900, in accordance with an example implementation. Remaining capacity data 714 is stored in table form as remaining capacity data table 900. The remaining capacity data table 900 stores information such as, but not limited to, slot name, remaining number capacity, remaining weight capacity, and remaining volume capacity. Remaining number capacity shows the remaining number of orders that can still be placed in the current bag. Remaining weight capacity shows the remaining available weight capacity of the current bag. Remaining volume capacity shows the remaining available volume capacity of the current bag.

Referring back to FIG. 7, the system 700 first collects order data which has yet to be sorted at step S720. Specifically, collecting order data associated with entries of order data table 800 labeled as "False" under already sorted field. Then system 700 then collects slot data at step S722 and remaining capacity data at step S724. From these data, the system 700 calculates expected number of bag replacement.

Figure 10:
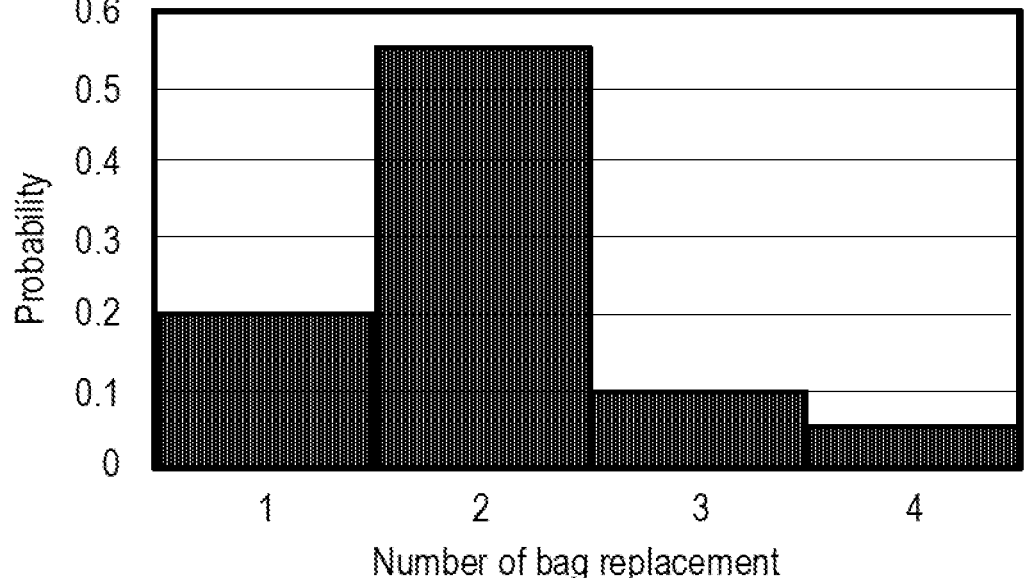
FIG. 10 illustrates an example distribution of bag replacement count, in accordance with an example implementation.

The system 700 calculates the distribution of the number of replacements at step S726, assuming that the bag is replaced at full capacity for each slot. FIG. 10 illustrates an example distribution of bag replacement count, in accordance with an example implementation. The distribution shows probability associated with each bag replacement number. The distribution can be obtained by enumerating all permutations and simulating the number of bag replacements for each, or by creating multiple permutations using random numbers and estimating the number of replacements from that sample. Next, the system 700 calculates the distribution of the number of replacement if the replacement took place now. It also stores the expected time until the next replacement, which is obtained during the course of this calculation.

Then the system calculates the expected number of replacements from these distributions respectively at step S728. If the expected value of this replacement when replacement took place now is the same as that when waiting until bag is full, the system issues bag replacement instructions at step S730. This allows the operator to receive bag replacement instructions ahead of time without increasing the number of bag replacement, and to allocate saved time to other machines. In some example implementations, replacement instructions may be issued when the difference between the two expected values is less than or equal to a preset threshold value.

Figure 11:
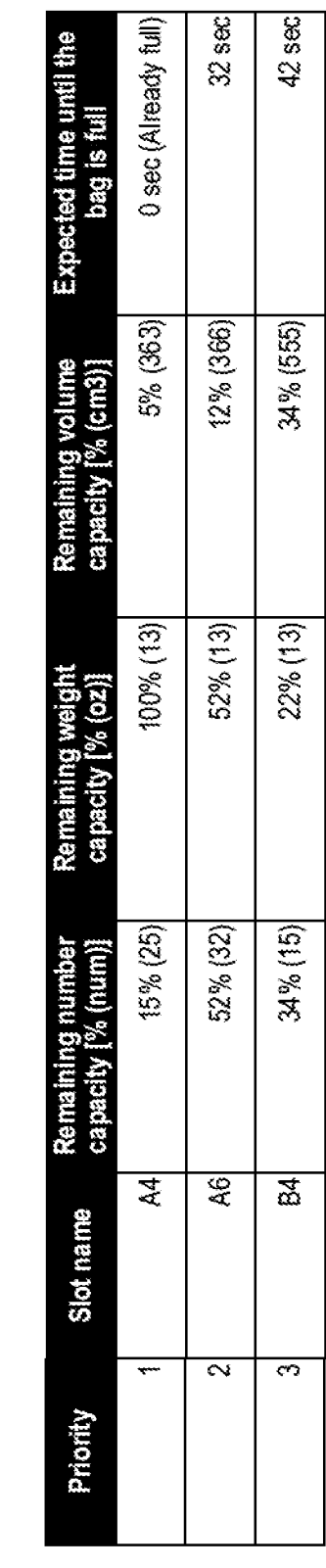
FIG. 11 illustrates an example bag replacement instructions screen, in accordance with an example implementation.

FIG. 11 illustrates an example bag replacement instructions screen, in accordance with an example implementation. As illustrated in FIG. 11, the bag replacement instructions screen shows priority for bag replacement in order of shortest expected time to next replacement, remaining capacity, and expected time until bag is full. This allows the operator to know in which order to replace bag. In the slot layout section of the bag replacement instructions screen, the slot icons can be color-coded to indicate associated state of each slot. For example, if a bag of a slot has already reached a bag capacity, the slot icon turns to the color red, as shown with slot A4. Similarly, other colors can be used to demonstrate different states associated with the slots.

As illustrated in FIG. 11, the bag replacement instructions screen may show a graphical display of the slot layout and a slot priority table showing priorities associated with bag replacement order. The priorities allow the operator or the system to know in what order the bags are to be replaced. For example, the first entry having the priority of "1" requires immediate attention as the bag has already reached maximum weight capacity. On the other hand, the second entry having the priority of "2" is placed between the first and the third entries, as the expected time until bag is full is between the first and the third entries.

The slot priority table may include information such as, but not limited to, priority, slot name, remaining number capacity, remaining weight capacity, remaining volume capacity, and expected time until the bag is full. Each entry of the slot-order allocation table is associated with an identified slot shown in the slot layout. The remaining number capacity, remaining weight capacity, and remaining volume capacity may be expressed in percentage or actual numbers. As illustrated in FIG. 11, the first entry having the priority of "1" has a remaining number capacity of "15%" and "25", a remaining weight capacity of "100%" and "13" for ounces, and a remaining volume capacity of "5%" and "363" centimeters cubed. Priority levels can be shown graphically in the slot layout through color-coding. In addition, the expected time until the bag is full or the bag status can be displayed next to the slots in the slot layout.

The foregoing example implementation may have various benefits and advantages. For example, destination of each order is determined, so that the throughput calculated from each travel time and the time required to replace bags is maximized. To improve total throughput including bag replacement, the volume and weight of each order to be sorted, the bag's loadable capacity, weight, quantity, and the travel time to each destination are used as inputs. To further improve throughput associated with the sorting system, bag replacement instructions are issued before bags are full to ensure no time is wasted over bag replacements.

Figure 12:
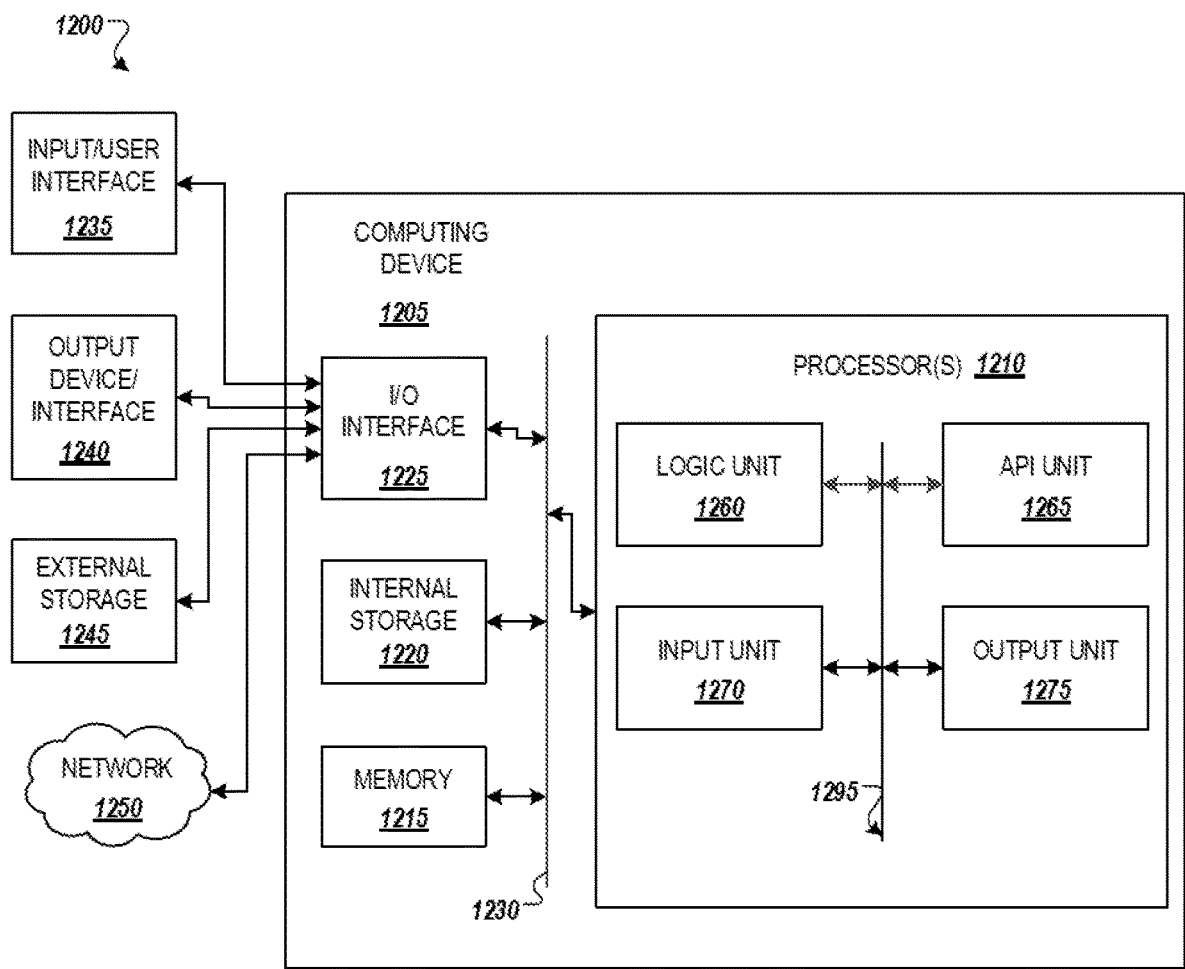
FIG. 12 illustrates an example computing environment with an example computing device suitable for use in some example implementations.

FIG. 12 illustrates an example computing environment with an example computing device suitable for use in some example implementations. Computing device 1205 in computing environment 1200 can include one or more processing units, cores, or processor(s) 1210, memory 1215 (e.g., RAM, ROM, and/or the like), internal storage 1220 (e.g., magnetic, optical, solid-state storage, and/or organic), and/or I/O interface 1225, any of which can be coupled on a communication mechanism or bus 1230 for communicating information or embedded in the computing device 1205. I/O interface 1225 is also configured to receive images from cameras or provide images to projectors or displays, depending on the desired implementation.

Computing device 1205 can be communicatively coupled to input/user interface 1235 and output device/interface 1240. Either one or both of the input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1240 may include a display, television, monitor, printer, speaker, braille, or the like. In some example implementations, input/user interface 1235 and output device/interface 1240 can be embedded with or physically coupled to the computing device 1205. In other example implementations, other computing devices may function as or provide the functions of input/user interface 1235 and output device/interface 1240 for a computing device 1205.

Examples of computing device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1205 can be communicatively coupled (e.g., via I/O interface 1225) to external storage 1245 and network 1250 for communicating with any number of networked components, devices, and systems, including one or more computing devices of the same or different configuration. Computing device 1205 or any connected computing device can be functioning as, providing services of, or referred to as, a server, client, thin server, general machine, special-purpose machine, or another label.

I/O interface 1225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computing device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks. Blu-ray disks), solid-state media (e.g., RAM, ROM, flash memory, solid-state storage), and other non-volatile storage or memory.

Computing device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl. JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs) or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, the input unit 1270, and the output unit 1275 in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide an output based on the calculations described in example implementations.

Processor(s) 1210 can be configured to collect order data and slot data, wherein the slot data is information associated with a plurality of slots, each slot of the plurality of slots allows for placement of item bag over slot, and the plurality of items is to be sorted and inserted into bags associated with the plurality of slots as illustrated in FIG. 2. The processor(s) 1210 may also be configured to calculate combinations of order-slot allocation based on the order data and the slot data to estimate total time as illustrated in FIG. 2. The processor(s) 1210 may also be configured to select a combination of the combinations of order-slot allocation with minimal total time and applying the selected combination as illustrated in FIG. 2.

The processor(s) 1210 may also be configured to display the selected combination and slot layout of the plurality of slots on a graphic user interface (GUI) as illustrated in FIG. 6. The processor(s) 1210 may also be configured to collect remaining capacity data associated with the plurality of slots as illustrated in FIG. 7. The processor(s) 1210 may also be configured to calculate first expected number of bag replacements, where the first expected number of bag replacements represents estimated number of bag replacement where replacement took place before bag capacity is reached as illustrated in FIG. 7. The processor(s) 1210 may also be configured to calculate second expected number of bag replacements, wherein the second expected number of bag replacements represents estimated number of bag replacement where replacement is only performed when bag capacity is reached as illustrated in FIG. 7. The processor(s) 1210 may also be configured to, for the first expected number of bag replacements being same as the second expected number of bag replacements, issue bag replacement instructions immediately without waiting for bag capacity to be reached as illustrated in FIG. 7. The processor(s) 1210 may also be configured to display the bag replacement instructions and slot layout of the plurality of slots on a graphic user interface (GUI) as illustrated in FIG. 11.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing." "computing." "calculating." "determining." "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to, optical disks, magnetic disks, read-only memories, random access memories, solid-state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored in the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for sorting a plurality of items and slot allocation in association with the plurality of items, the method comprising:

collecting order data and slot data, wherein the slot data is information associated with a plurality of slots, each slot of the plurality of slots allows for placement of an item bag over the slot, and the plurality of items is to be sorted and inserted into bags associated with the plurality of slots;

calculating combinations of order-slot allocation based on the order data and the slot data to estimate total time, wherein calculating the combinations of order-slot allocation comprises performing mixed integer programming to calculate total sorting time using a cycle time of sorting for each slot multiplied by number of orders assigned to each slot, and calculating a number of bag replacements for each slot using weight capacity estimation or volume capacity estimation, wherein the total time is calculated based on the total sorting time, a cycle time of bag replacement, and the number of bag replacements;

selecting a combination of the combinations of order-slot allocation with minimal total time and; and controlling a robot to insert the plurality of items into the bags associated with the plurality of slots according to the selected combination;

wherein the number of bag replacements for each slot is an expected value of number of bags to be replaced derived by performing the weight capacity estimation associated with each of the plurality of slots.

2. The method of claim 1, wherein the slot data comprises capacity data, cycle time of sorting, and cycle time of item bag replacement.

3. The method of claim 1, wherein the order data comprises processing time, item weight, and item dimensions associated with each item.

4. The method of claim 1, wherein the total time is calculated based on the total sorting time, the cycle time of bag replacement, and the number of bag replacements, and wherein the number of bag replacements is calculated by performing at least one of the weight capacity estimation associated with the plurality of slots or the volume capacity estimation associated with the plurality of slots.

5. The method of claim 4, wherein the weight capacity estimation, for each slot of the plurality of slots, is generated using a weight sum of items assigned to the slot over weight capacity of the slot, and wherein the volume capacity estimation, for each slot of the plurality of slots, is generated using a volume sum of items assigned to the slot over volume capacity of the slot, the volume sum is sum of assigned items' volumes, and each item's volume is derived from product of the item's item length, item width, and item height.

6. The method of claim 1, further comprising displaying the selected combination and slot layout of the plurality of slots on a graphic user interface (GUI).

7. The method of claim 6, further comprising displaying the bag replacement instructions and the slot layout of the plurality of slots on the GUI.

8. A non-transitory computer readable medium, storing instructions for sorting a plurality of items and slot allocation in association with the plurality of items, the instructions comprising:

collecting order data and slot data, wherein the slot data is information associated with a plurality of slots, each slot of the plurality of slots allows for placement of an item bag over the slot, and the plurality of items is to be sorted and inserted into bags associated with the plurality of slots;

calculating combinations of order-slot allocation based on the order data and the slot data to estimate total time, wherein calculating the combinations of order-slot allocation comprises performing mixed integer programming to calculate total sorting time using a cycle time of sorting for each slot multiplied by number of orders assigned to each slot, and calculating a number of bag replacements for each slot using weight capacity estimation or volume capacity estimation, wherein the total time is calculated based on the total sorting time, a cycle time of bag replacement, and the number of bag replacements;

selecting a combination of the combinations of order-slot allocation with minimal total time; and controlling a robot insert the plurality of items into the bags associated with the plurality of slots according to the selected combination;

wherein the number of bag replacements for each slot is an expected value of number of bags to be replaced derived by performing the weight capacity estimation associated with each of the plurality of slots.

9. The non-transitory computer readable medium of claim 8, wherein the slot data comprises capacity data, a cycle time of sorting, and a cycle time of item bag replacement.

10. The non-transitory computer readable medium of claim 8, wherein the order data comprises processing time, item weight, and item dimensions associated with each item.

11. The non-transitory computer readable medium of claim 8, wherein the total time is calculated based on the total sorting time, the cycle time of bag replacement, and the number of bag replacements, and wherein the number of bag replacements is calculated by performing at least one of the weight capacity estimation associated with the plurality of slots or the volume capacity estimation associated with the plurality of slots.

12. The non-transitory computer readable medium of claim 11, wherein the weight capacity estimation, for each slot of the plurality of slots, is generated using a weight sum of items assigned to the slot over weight capacity of the slot, and wherein the volume capacity estimation, for each slot of the plurality of slots, is generated using a volume sum of items assigned to the slot over volume capacity of the slot, the volume sum is sum of assigned items' volumes, and each item's volume is derived from product of the item's item length, item width, and item height.

13. The non-transitory computer readable medium of claim 8, further comprising displaying the selected combination and a slot layout of the plurality of slots on a graphic user interface GUI.

14. The non-transitory computer readable medium of claim 8, further comprising displaying bag replacement instructions and a slot layout of the plurality of slots on a graphic user interface GUI.

* * * * *